July 20, 1926.
W. E. URSCHEL
1,593,229
ICE CREAM CUTTING MACHINE
Filed May 8, 1922
3 Sheets-Sheet 1
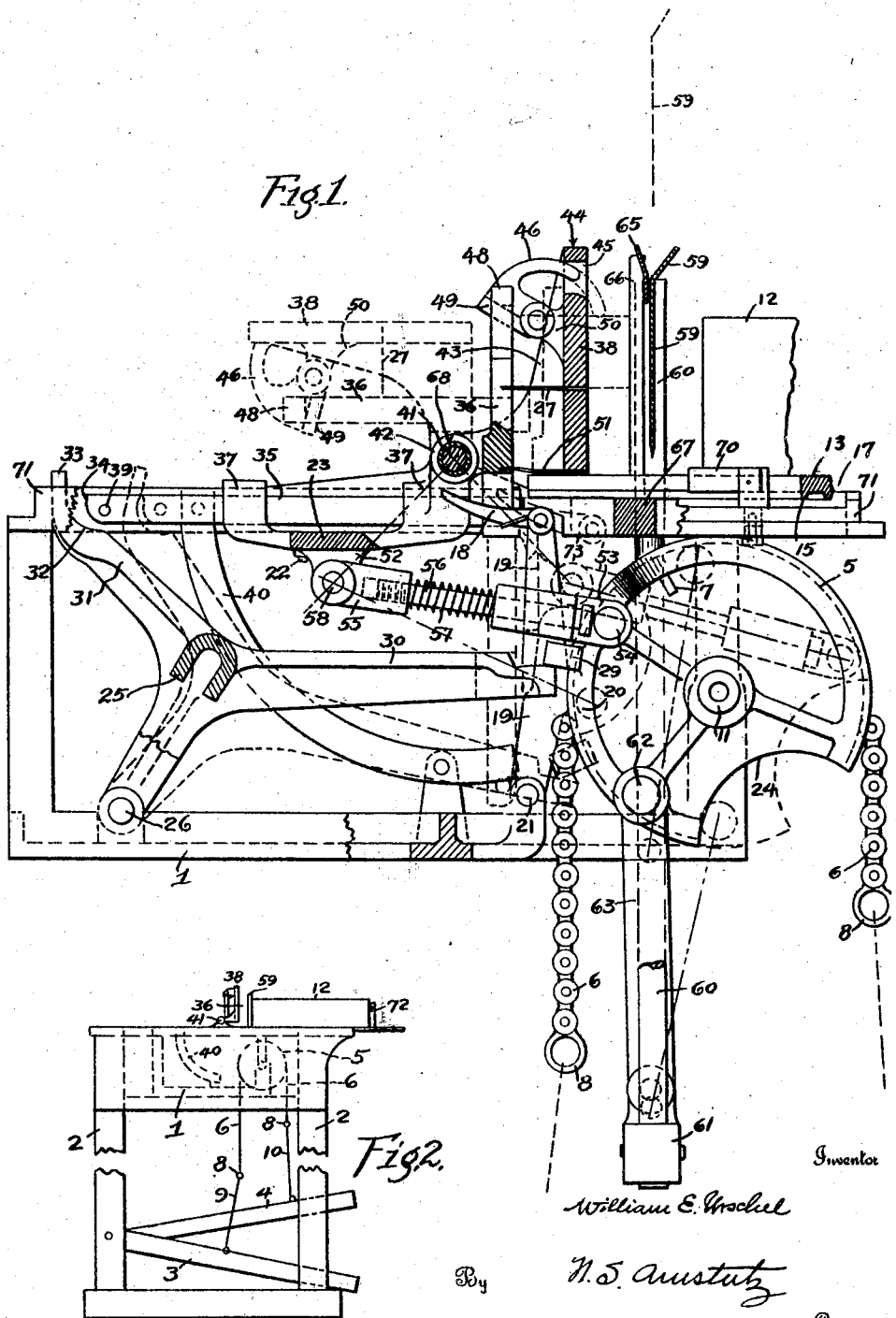

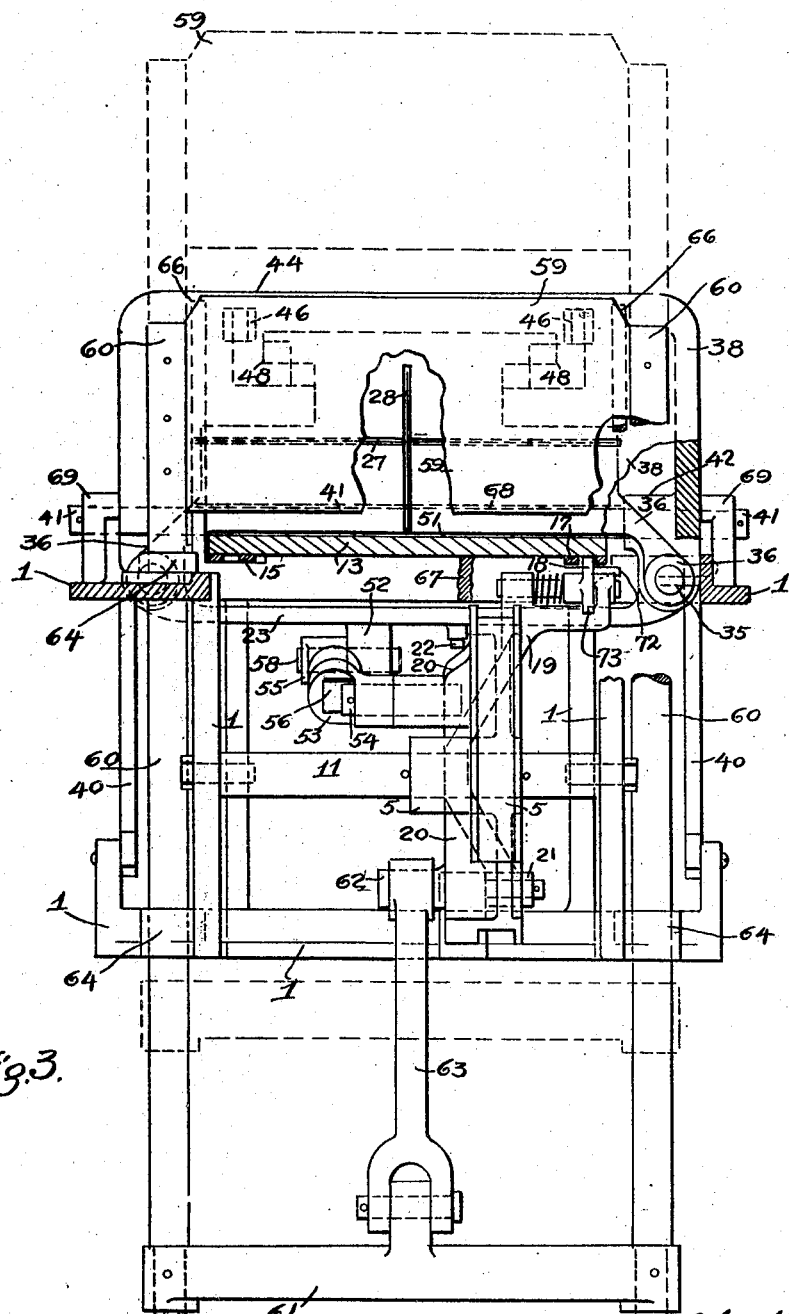
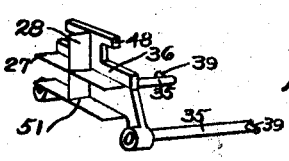

July 20, 1926.

W. E. URSCHEL 1,593,229

ICE CREAM CUTTING MACHINE

Filed May 8, 1922

William E. Urschel, Inventor

N. S. Amstutz

By

Attorney

Patented July 20, 1926.

1,593,229

UNITED STATES PATENT OFFICE.

WILLIAM E. URSCHEL, OF VALPARAISO, INDIANA.

ICE-CREAM-CUTTING MACHINE.

Application filed May 8, 1922. Serial No. 559,486.

My invention relates to improvements in ice cream cutting machines, and it more especially consists of the features hereinafter pointed out in the annexed claims.

The purpose of my invention is to provide an automatic device which will step by step divide a block of ice cream into slabs cut across the block; that will immediately following divide the slab into separate parts; that will deliver the sections from a vertical to a horizontal position quite disconnected from each other; and that will cut ice cream blocks into any desired number of sections according to the demands of chocolate coating or of individual servings.

With these and other ends in view, I illustrate in the accompanying drawing such instances of adaptation as will disclose the broad underlying features without limiting myself to the specific details shown thereon or described herein.

Figure 1 is a side elevation, partly in section showing portions broken away.

Fig. 2 is a diagrammatic reduced size, elevation of the foot treadle connections.

Fig. 3 is an end elevation same size as Fig. 1 with parts broken away.

Fig. 11 is a perspective view of the knife plate.

Figure 4:
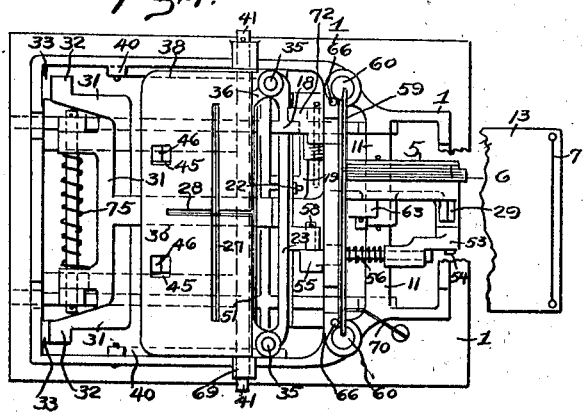
Fig. 4 is a reduced scale plan view of Fig. 1.
Figure 7:
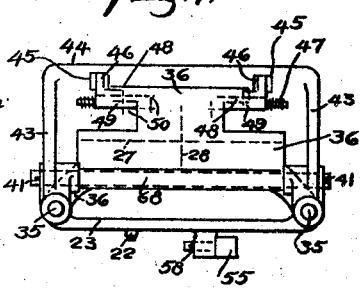
Fig. 7 is a rear elevation of the delivery table, etc., in its vertical or "cutting" position.

In practically carrying out my invention, I may use the specific details shown or any equivalents thereof which will move a block of ice cream underneath a knife to a given distance, cut through the block to form a slab, support the slab on the bottom and on the outside face, divide it into separate parts and remove them from the uncut block, withdraw the knife, move the block forward the required distance, and also prevent the cut off slab from following the knife as it is withdrawn and also hold the separated sections or parts from adhering to the front of the block from which the divided slab is cut.

These functions may be performed as shown with the knife moving vertically or by supporting the block underneath and on its side and moving the knife, etc. horizontally. The sequence of operation being substantially the same in either case, and as the results are practically identical, such a modification, or any other, will come within the spirit of my invention.

Any desired form of frame may be used in which the functioning elements are supported. As instanced in the drawings, the frame 1 is of skeleton form. It is supported on any type of frame 2 in which two pedals 3 and 4 are pivoted. The pedals work in opposite directions, one group of the functions being performed when the treadle 3 is used and another when treadle 4 is depressed. They are connected to the operating wheel 5 as follows. A chain 6 is detachably secured to the wheel 5 by means of a pin 7 or any other expedient. The chain 6 has eyes 8 to which connections 9 and 10 are secured. These are respectively fastened to the treadles 3 and 4, thus through an alternate up and down movement of the treadle the wheel 5 is oscillated on its axis 11. I do not limit myself to this oscillating wheel as continuously rotating, or other means, attached to a motor, may be used without departing from the spirit of my invention.

Figure 9:
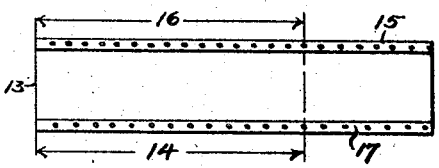
Fig. 9 is a bottom plan view of the ice cream carrying table.

The ice cream indicated at 12 Fig. 1 rests on a slidable table 13 which has a perforated or notched guide strip 15 under one edge, as shown in Figs. 3 and 9, and a strip 17 under the other edge. The only difference between the two strips is the change in number of notches. The strip 15 has, say, 16 notches within the same dimension as the strip 17 has 14, thus enabling one to cut a block of ice cream into different sized slabs etc. If other sizes are desired, boards having differently spaced notches may be used. To compensate for these differences of movement, the spring pressed actuating pawl 18 and its lever 19 may move in an outward direction a uniform distance and the movement of the lever 19 in an opposite direction may be made variable or vice versa by increasing or decreasing the arm or lever 19 where it engages the cam portion 20 of the wheel 5. The lever 19 has its lower end pivoted to the frame at 21. The cam 20 moves it outward and the knob 22 of the rocking table tie piece 23 moves it in the opposite direction when the wheel 5 is in the position shown in Fig. 6 so that the cut-away portion 24 of the wheel will permit the lever 19 to move into a re-starting position. An adjusting screw, not shown, may be placed in the lever 19 to engage the cam 20, instead of changing the form of the lever. These features however may be subject to almost unlimited changes which are well known and understood. As my invention is not limited to these expedients none others are described.

In the position of the parts shown in Fig. 1, the wheel 5 has almost completed its movement toward the left. It is just about to move the rocker frame 25 pivoted at 26 so as to cut a slab of ice cream into separate parts by means of horizontal knife 27 and vertical knife 28. This function is accomplished by the projection 29 engaging the arm 30 to move the rocker 25. At the rear end of the rocker two upstanding projections 31 are formed. These terminate in a curved portion 32 and a pushing end 33 adapted to engage the outer end 34 of the knife operating rods 35 that are attached to the knife supporting member 36.

The rods 35 pass through bearings 37 of the rocking table 38 and they have free endwise movement therein, being pushed into the cutting position by the rocker ends 33 and withdrawn by pins 39 projecting from the rear end of each rod 35. These pins engage the curved side pieces 40, whose curve is eccentric to the center of the pivot rod 41 of the rocking table 38, when the table 38 is rocked to lift the cut portions of the ice cream into a horizontal position shown in Fig. 6.

The rocking table 38 has side ribs 43 which merge into suitable hubs 42 and these are integrally connected with the bearings 37. There are two bearings 37 for each of the rods 35 and they are connected by the joining member 23. Right angled slots are formed entirely through the table for the knives 27 and 28. Near the outer edge 44 of the table 38 openings 45 are formed. These serve to admit the ends of the curved fingers 46 when they are actuated by separate springs 47 as the knife plate 36 moves forward and in the reverse direction by the projections 48 of the knife plate when it moves rearward through the engagement of inclines 49 of the fingers 46 by the projections 48. The fingers 46 are pivoted on ears 50 integrally formed on the rear side of the table 38. The knives 27 and 28 are secured to the supporting knife-plate 36 in any suitable manner. On the under side of the knife-plate 36, a thin lifting plate 51 is secured. This passes through under the edge of the rocking plate 38 and under a divided and severed slab of ice cream so as to hold it in position while the table 38 is rocked into a horizontal position as shown by dotted lines in Fig. 1, and in full lines in Figs. 4 and 6.

Figure 5:
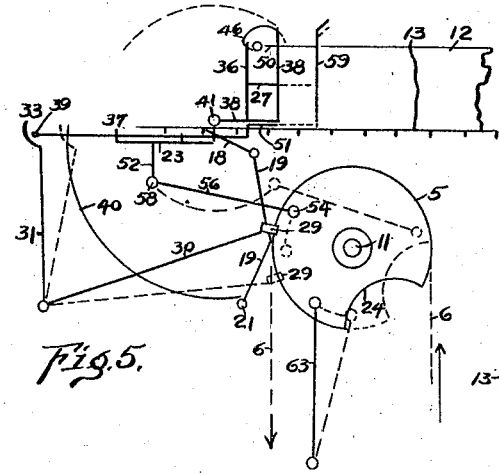
Fig. 5 is a diagrammatic elevation of the interrelated moving parts.
Figure 8:
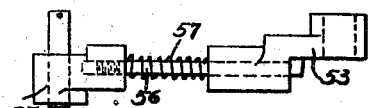
Fig. 8 is a detached plan view of an elastic adjustable connection between the tilting delivery table and the operating wheel.
Figure 6:
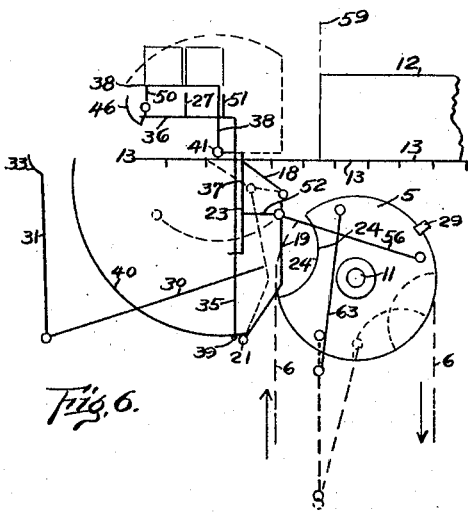
Fig. 6 is also a diagrammatic elevation similar to Fig. 5 with the parts shifted into another position, ready to deliver the separated sections of ice cream.
Figure 10:
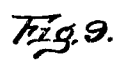
Fig. 10 is a detached elevation of the means used to hold the knife shifting bars in position while the horizontal cuts are being made.

The rocking table 38 is actuated by the wheel 5 through a compensating and adjusting link that is pivoted to an ear 52 depending from the connecting member 23, whenever the wheel 5 is moved to the right as shown in dotted lines in Figs. 1 and 5 and in full lines in Fig. 6. The link is pivoted on wheel 5 by means of pin 54. It consists of two end parts 53 and 55 joined by a bolt 56 that is threaded in the part 55. The bolt has a rectangular head which prevents it turning and it passes through a coil spring 57 placed between the ends 53 and 55. The distance between the centers of the two ends can be varied within limits by giving the end 55 a complete turn, thus also changing the tension of the spring 57.

The purpose of this compensating link is to, as stated, move the rocking table 38 into its two positions and after having moved it into the position shown in Fig. 1, the wheel 5 must move still farther as shown in dotted lines in Fig. 1, in order to depress the arm 30 and pass the knives 27 and 28 entirely through the slab of the ice cream. During this movement the connecting link passes over the center between axis 11 and pivot 58 at which time the spring 57 is compressed, thus allowing extra end movement of the bolt 56 to compensate for the change in distance between the centers 54 and 58.

The knife 59 is secured between vertical rods 60 that are joined at the lower end by a yoke 61. This yoke is attached to a pin 62 of the wheel 5 by means of a link 63. The rods slide up and down in bearings 64 of the frame 1. Between the knife 59 and the table 38, a scraper 65 is supported on two posts 66. It serves to prevent a detached slab from adhering to the knife 59 as the latter is raised. Directly beneath the knife 59, a cross member 67 of the frame is placed to support the board 13. As shown in Fig. 1 the board 13 is not pushed fully into its self feeding position. Its forward end must be under the tubular roller 68 that is placed on the shaft 41 which forms the pivot for the rocking table 38. This shaft has bearing in the ears 69 of the frame 1.

A side tension 70 is mounted on the frame as shown in Figs. 1 and 4 which serves to prevent the board 13 from having too free movement. The guide plates 15 and 17 of the board slide in notches formed in the member 67 and end members 71 of the frame. These serve to keep the board in proper alignment. When the feed of the board 13 is to be changed within the limits of its two guide plates 15 and 17, it is placed on the machine so that its ends are in reverse position when the pawl 18 will operate to move the board along step by step, once for each oscillation of the wheel 5.

In operating the machine, the board 13 is placed into its first feeding position with its end somewhat past the roller 68 so that the pawl 18 is in engagement with one of the notches of its guide plates. The block of ice cream may then be slid through under the raised knife 59 into engagement with the table 38 after which the knife is lowered by means of link 63 thus cutting off a slab of the ice cream. At about the same time the knives 27 and 28 divide the slab into four parts and as the knife 59 is again moving into its raised position, the table 38 with its four pieces of ice cream is rocked into a horizontal position. During this time the knives 27 and 28 are withdrawn from the table so as to leave it quite smooth for the removal of the separate cakes of ice cream. Before the severing knife reaches the ice cream the table is pushed forward into a new position so that the operation can be repeated as rapidly as the treadles 3 and 4 are alternately moved. If for any reason, it is desired to move the board rearwardly the pawl 18 can be depressed by means of a finger projection 72. This pawl has a depending projection 73 that prevents it moving too far upwardly when the table 13 is not in position on the machine.

The sequence of steps for a complete operation is as follows:—A block of ice cream is placed on the sliding support or board 13 in front of a projection 74 which prevents the ice cream sliding rearwardly on the board as the board moves forward underneath the raised severing knife 59 the width of a slab. The severing knife 59 then moves downward and at the same time the rocking table 38 is moved into position in front of the block of ice cream to form an abutment thereto as is shown in Fig. 1. Just before the severing knife 59 reaches its lowest point the dividing knives 27 and 28 and the lifting plate 51 are moved past the rocking table 38 into contact with the slab of ice cream which by this time is almost completely severed. Three movements now follow each other, the severing knife is raised, the rocking table is moved to bring the divided portions of ice cream into a horizontal position and at the same time withdraw the dividing knives and lifting plate from the ice cream and below the surface of the table on which the ice cream rests in readiness for a repetition of the operation.

The pivoted arm 30 is held against the actuating projection 29 by a coil spring 75 shown in Fig. 4. It may also be moved by positive mechanical means, if desired.

It will be seen that the related functions can be carried out with various expedients and it is pointed out that the invention is claimed in its broadest aspect.

What I claim is:

1. In ice cream cutting machines, a slidable support for holding a block of ice cream, a frame therefor, a severing knife movable transversely of the support, a pivoted abutment in advance of the knife, a knife holder carried by said abutment and slidable thereon, dividing knives carried by said holder, means for moving the severing knife at intermittent periods, means for moving the dividing knives perpendicular to the severing knife and for retracting said dividing knives, and means for rocking the table into a delivery position.

2. In ice cream cutting machines, a slidable support adapted to hold a block of ice cream, a frame therefor, a severing knife, a pivoted abutting member, a slidable knife carrier supported by said member, dividing knives projecting from said carrier and adapted to be moved through slotted openings in the abutting member, a lifting plate secured to said carrier below the dividing knives, and means for coordinately moving the severing knife to and from the dividing knives in and out rocking the abutting member and intermittently moving the slidable support.

3. In ice cream cutting machines, a movable support for holding a block of ice cream, a supporting frame therefor, a severing knife moving crosswise of the support adapted to sever a slab from the block of ice cream, and separate cutting means movable lengthwise of the support adapted to divide the previously severed slab, said severing knife serving to hold the slab against movement while it is subjected to the second cutting operation.

4. In ice cream cutting machines, a suitable frame, a movable support for holding a block of ice cream, a severing knife movable transversely of the support for severing a slab from the block of ice cream, and separate cutting means movable toward the severing knife adapted to divide the severed slab while it is held against movement by the severing knife.

In testimony whereof I affix my signature.

WILLIAM E. URSCHEL.